Patented June 15, 1943

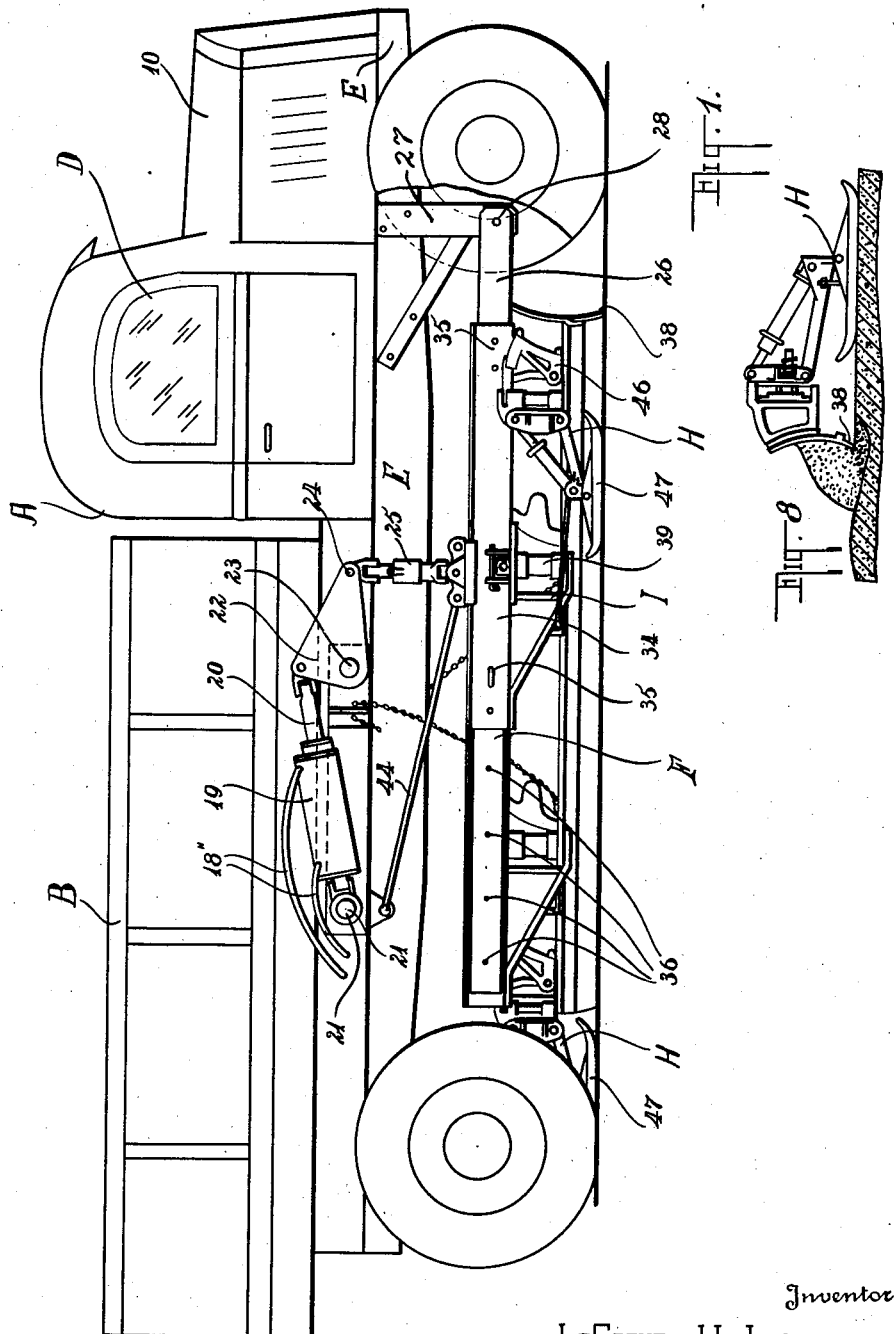

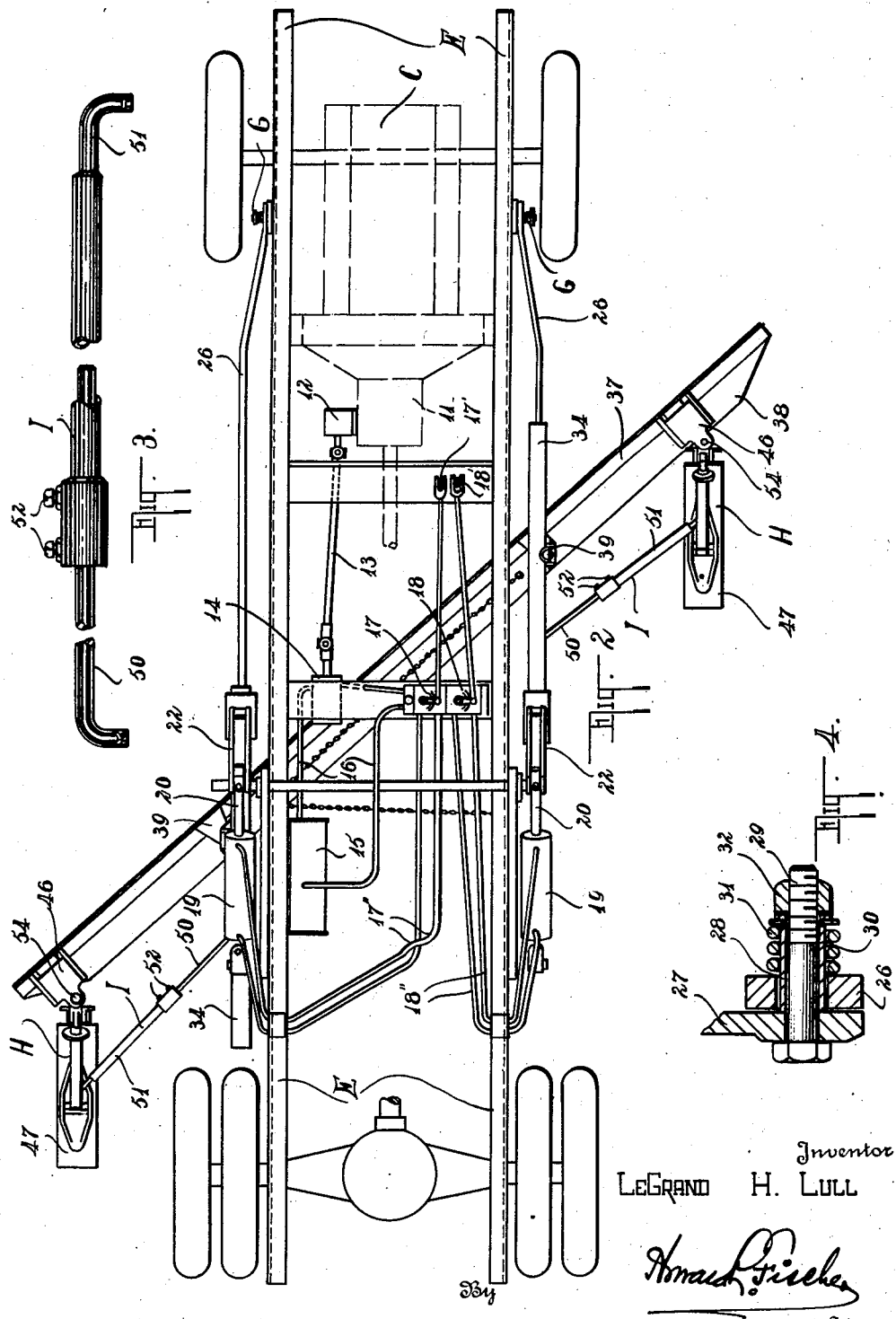

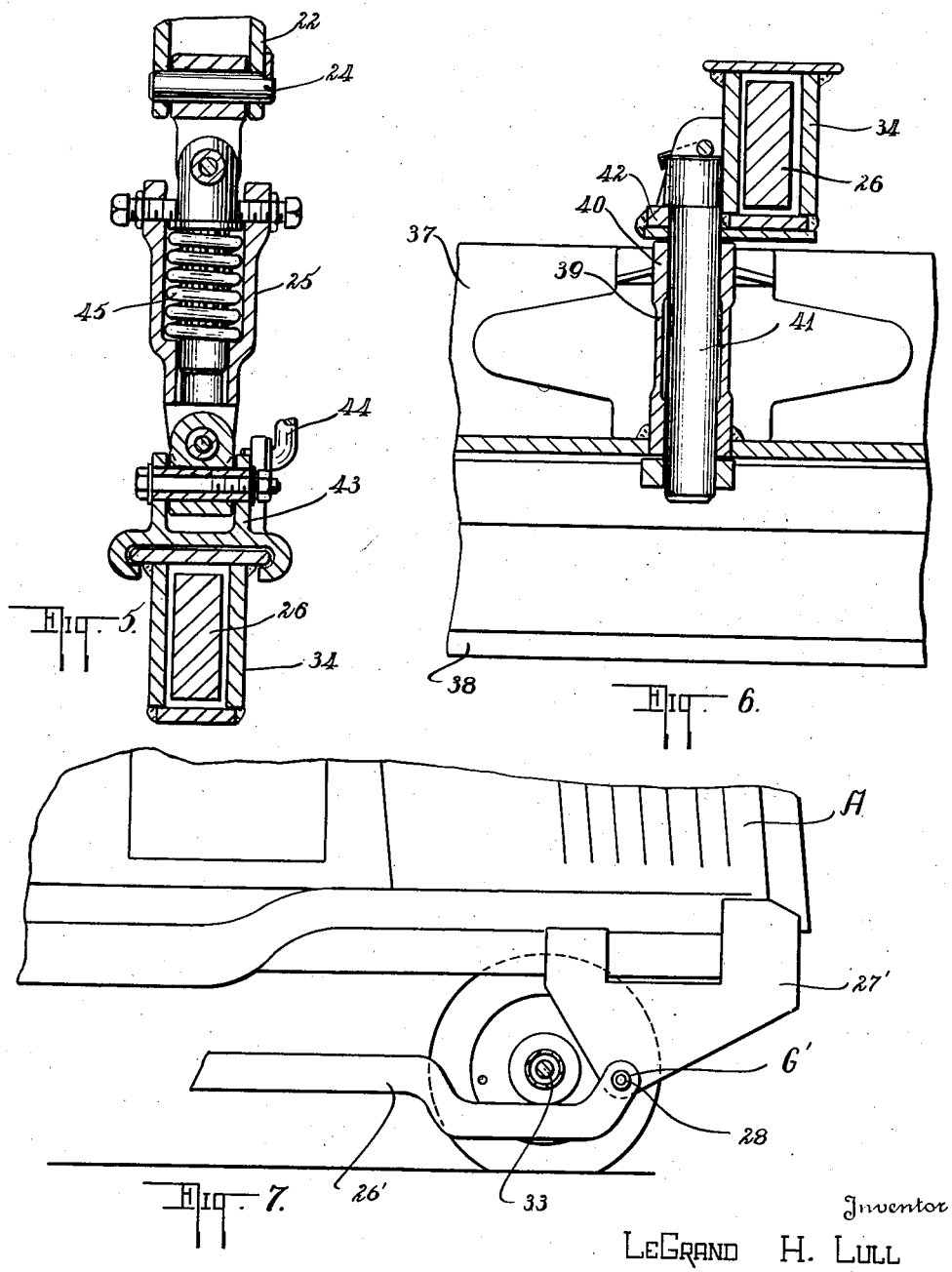

2,321,833

UNITED STATES PATENT OFFICE 2,321,833

MOTOR VEHICLE UNDERBODY TRUCK
GRADER

Le Grand H. Lull, Minneapolis, Minn.

Application July 19, 1940, Serial No. 346,382

6 Claims. (Cl. 37—155)

My invention relates to an under-body grader for motor vehicles and method of control which provides a means for rapid operation over the highway with a means of leveling the surface of the road more accurately than has been accomplished heretofore with an under-body grader by reason of my chatter eliminator which overcomes a chattering or vibrating of the mold board of the grader and steadies the scraper blade in operation. With my under-body grader the road may be leveled out smooth in an even plane even though the scraper blade is moved rapidly over the surface of the road, owing to the control of the blade by my levelizers.

The grader will pull easier because the mold board may be set in an upright cutting position, permitting the material to roll freely in front of the scraper blade instead of dragging and piling up in a manner to unnecessarily retard the scraping blade and permitting the levelizing of the road surface with the mold board in this upright position at any travel speed over the road. It is not possible to operate an under-body grader in this manner unless the mold board and scraper blade are controlled by a levelizing means, such as I have provided and which is the subject matter of my Patents Numbers 2,108,541 and 1,968,412. The grader is adapted to spread or drift material uniformly without chatter at any maintenance speeds and to cut and spread material uniformly, either fast or slow, whether the material is wet or dry, due to the levelizer controlled blade.

A further feature of my under-body grader motor vehicle resides in the construction of the grader mechanism in combination with the means of supporting the same in relation to the truck chassis and body and by means of controlling the blade so that it will cut off the tops of the corrugations, leaving the surface smooth and not following the path of least resistance as old forms and types of graders have done in the past. This is due to the levelizer means which changes the pressure on the cutting edge of the blade, holding it firm to cut off the high spots, and preventing it from dropping into the low spots; thereby grading the road surface smooth and even. Heretofore, due to the flexible mounting or resiliency of the chassis of motor trucks, great difficulty has been experienced in endeavoring to provide an under-body grader for road maintenance, and many graders of this character have failed to operate successfully. However, my underbody grader with the levelizer means for controlling the mold board and scraper blade, operates successfully to provide a road maintenance device in a motor truck having its chassis and body supported by springs and with the grader and levelizer mechanism mounted upon the frame of the chassis of the motor truck and adapted to operate unaffected by the springy action of the truck springs, because the levelizers keep the scraper blade and mold board steady at all times.

Heretofore truck scrapers have been provided wherein the blade had to be positioned inclined forwardly so that the blade acted as a drag over the road instead of having an upright cutting edge. In this type, the scraper follows the path of least resistance and pulls hard because it requires considerable pressure to try to get the blade to cut the high spots in leveling a road. These old forms of graders also dug out the low spots because they are usually soft and easy to cut away. Further, the mold board in these old constructions tends to wedge or pack the material instead of having it roll in a circular motion on the mold board, causing a heavy draft and the deposit of the material in the wrong places because of the plugged blade. In still other old forms of graders, the mold board may be positioned at right angles to the road surface, however, without my levelizers even though operated at a slow speed, will chatter, teeter, gouge, and jump, whereas, when my grader construction is employed, the mold board may be set in right angular position to the road and being equipped with my levelizers the mold board is held steady, preventing chattering, teetering, and jumping, and permitting maintenance at any reasonable speeds of the grader motor vehicle. The levelizer means in my grader holds the mold board off and the scraper blade away from the lower surfaces and permits the filling in of the holes when it reaches the high spots, and thus there is more pressure on the scraper blade to cut down the high spots and at the same time less pressure on the levelizer means, thereby automatically applying more or less pressure at the right time to make the road surface very smooth.

My invention includes a motor vehicle under-body grader and the method of operating the same consisting in operating the mold board and grader blade to raise or lower the same at either end or on both ends simultaneously by means of the power of the vehicle propelling means during the operation of the vehicle over the road with the grader mechanism mounted to the chassis between the front and rear wheels to rapidly grade a road with an even level surface. Further, the method consists in leveling a road by a motor vehicle having its chassis mounted on springs, with a grader mechanism positioned between the wheels to direct the weight of the vehicle against the grader mechanism and operating the grader mechanism toward and away from the road surface by the power propelling the vehicle and steadying the grader against chattering, thereby rapidly leveling the road surface by the movement of the vehicle over the same.

It is also a feature to provide a combination of elements wherein grader mechanism including a scraper blade and mold board are carried by the chassis of a motor vehicle with drawbars extending to the front end of the motor vehicle chassis to pull the grader over the ground and at the same time direct the weight of the vehicle against the beams which support the mold board of the scraper. Also, operating the beams and mold board of the scraper mechanism toward or away from the ground by means of the power of the motor vehicle including hydraulically operated cylinders which cushionally operate the mold board and scraper; also, combining a levelizing means near the ends of the scraper blade which eliminates chattering of the blade and permits the motor vehicle to travel rapidly over the road being graded, the levelizing means compensating for the springy mounted scraper blade whch is operated by the hydraulic cylinders and which is resiliently supported in relation to the road by the springs of the motor vehicle.

Further the invention includes the combination of a motor vehicle, with an under-body grader including means for operating the grader by the unit of power which operates the motor vehicle and which permits the motor vehicle to be propelled and the simultaneous operation of the grader toward or away from the ground to adjust either end of the grader blade independently or collectively. The grader mechanism includes means for pulling the grader blade mechanism from the forward end of the chassis, and adjustable means to set the blade in any angular position beneath the chassis, together with the steadying means for the mold board and scraper blade which holds the blade counterbalanced in a manner to compensate for inequalities in the road and causes the blade to travel in a smooth level plane without chatter or vibration.

In the drawings forming a part of this specification:

Figure 1 is a diagrammatic side view of a motor vehicle truck, showing my under-body grader secured thereto.

Figure 2 is a plan view of my grader, showing diagrammatically and in skeleton formation, the chassis of the motor vehicle.

Figure 3 is an enlarged detail of one of the telescopic bracing arms used on my grader.

Figure 4 is an enlarged sectional view of the forward end of the drawbar beams which attach the grader to the forward end of the chassis in one form of the grader.

Figure 5 is an enlarged detail sectional view illustrating the linkage and cushioning means which connects the beams of the grader to the link operated by the hydraulic cylinders.

Figure 6, shown partly in section, illustrates the pivotal connection of the mold board to the slidable or adjustable beam which connects the grader to the drawbars.

Figure 7 illustrates a portion of the front end of the chassis of the motor vehicle, showing a different form of connecting the drawbars in front of the front axle of the motor vehicle.

Figure 8 is a diagrammatic cross-sectional illustration of the blade in correct cutting position and as used in my method with the blade held under constant control by the levelizers, and the action of the hydraulic ram cylinders on the chassis, not illustrated in this view.

The motor vehicle A shown in the drawings is simply diagrammatic to illustrate a form of vehicle that may be used to carry my under-body grader. The vehicle A may be of any construction and as shown in the drawings, is a truck of ordinary type where the body B may be used to carry gravel, rock or any other road material, and may be operated by an under-body hoist, not illustrated. Hoists of this character are used extensively in elevating a portion of the body, such as B, so that the material in the body may be dumped or slid out of the same onto the roadway or ground. The vehicle A is provided with a power plant C under the hood 10 and diagrammatically illustrated in dotted outline in Figure 2. The power plant usually is of an internal combustion engine, being self-contained and operated by gas or the power plant C may be of a Diesel type engine and is provided with a transmission 11. From the transmission 11 a power take-off unit 12 is provided which drives through the shaft 13 a gear pump 14 which pumps oil from the reservoir 15 through the pipes 16 and is controlled by the valves 17 and 18. The valves 17 and 18 are normally operated from within the cab D of the motor vehicle A by suitable levers 17' and 18'.

The valve 17 is connected by piping 17" to the hydraulic cylinder 18 which is positioned on one side of the chassis E, whereas, the valve 18 is connected by the piping 18" to another hydraulic cylinder 19 on the opposite side of the chassis E. The cylinders 19 are identical and are adapted to be operated hydraulically to operate the piston rods 20 when the valves 17 and 18 are operated. When the valves 17 and 18 are in a neutral position, then the fluid may pass through the gear pump 14 and around through the reservoir 15 and through the piping 16, thus permitting the power take-off 12 to continue to operate when the engine unit C is in operation, thereby keeping the hydraulic fluid operating through the pump 14 and in readiness to operate the cylinders 19 at any time by the operation of the levers 17' and 18'.

The cylinders 19 are pivotally connected to the chassis at 21 so that they may swing in operation to adjust themselves into the desired position. The piston rods 20 are connected to the triangular-shaped links 22 which are pivoted at 23 to the chassis and also pivotally connect on the forward end at 24 to the operating cushion links 25. The cylinders 19 are adapted to operate and control the grader mechanism F which is positioned under the chassis E and adapted to be raised or lowered by the cylinders 19 when desired.

The grader mechanism F includes a pair of drawbars 26 positioned on each side of the chassis E and in the construction illustrated in Figures 1 and 2, the forward ends of the drawbars are supported by the depending bracket 27 and pivotally connected thereto at 28. The connection at 28 may include the bolt 29 which extends through the bracket 27 and which is adapted to carry a sleeve 30 on which the front ends of the drawbars 26 ride. Coil springs 31 cushion the pivoted ends of the drawbars 26 and are held by suitable nut and lock means 32. This spring pivotal mounting G provides the resiliency and pivotal support for the forward ends of the drawbars 26 to cushionally attach these bars to the chassis frame E. It will be apparent that the drawbars 26 are supported close to the front wheel axles and front end of the chassis E, so that the pull on the drawbars is at the front of the vehicle A.

When it is desired brackets 27' may be provided as illustrated in Figure 7, and the drawbars 26' may be mounted at 28' by the connecting units G'; however, in this construction the drawbars 26' are offset to extend under the front axle 33 of the vehicle A. In this form of construction, the drawbars 26' are mounted ahead of the axle of the vehicle instead of at the rear of the same, thereby positioning the pull on the drawbars closer to the front end of the vehicle A.

Upon the drawbars 26, I provide slidable tubular beam members 34 which are adjustably connected to the drawbars by the link 35. The drawbars 26 are formed with a series of holes 36 which permit the beams 34 to be set in the desired position.

The mold board 37 and the scraper blade 38 of the grader mechanism F, are adapted to be pivotally secured to the tubular beams 34 by the bracket 39 which is formed with a tubular bearing end 40 to receive the pin 41 extending down from the bracket portion 42 which is integrally connected to the side and bottom portion of the beam 34. There are two of these connecting members, one for each member 34 on each side of the chassis of the vehicle A. This pivotal connection holds the mold board 37 and the scraper or grader blade 38 adjustable transversely of the chassis E. Figure 2 shows the scraper blade 38 held at an angle so that the material scraped by the blade will run off of the left end or side of the blade, thus causing any road material scraped by the blade to tend to be directed toward the machine. When it is desired to run the material off toward the right, the blade 38 is adjusted by moving the slidable tubular beams 34 into a position opposite to that illustrated in Figure 2 on the drawbars 26. It will also be apparent that the blade 38 may be set at right angles transversely of the longitudinal formation of the chassis E. When the blade 38 is positioned at right angles, then the material may be scraped forwardly, the grader acting as a forward scraper to carry the material forward in the operation of the vehicle A. In this position, the drawbars 26 slant outwardly from their pivot units G to extend with their rear ends away from the sides of the rear portion of the chassis E.

The cushion link 25 pivotally connects the triangular link 22 with the beam 34 through the bracket member 43 which is slidably secured to the top plate of the beam 34 as illustrated in Figure 5. The bracket 43 is held in position on the beam 34 by the link bracing arm 44. The cushion link 25 is provided with a coil spring 45 which acts to provide a spring cushion between the pressure of the ramming cylinders 19 and the beam 34. This cushion means in the link 25 also absorbs severe road shock against the scraper blade in the operation of the scraper.

The scraper blade 38 is held against chattering in its operation by the levelizers H which are attached to the mold board 37 of the scraper 38 by means of the bracket 46. Each levelizer H is provided with a ground shoe or skid 47 which is adapted to slide along the surface of the ground bearing against the same. Spring means, not illustrated, is contained within the levelizer H as disclosed in my Patents 2,108,541 and 1,968,412, which causes the shoe skid 47 to bear against the ground with a degree of spring pressure which has a tendency to cushion the blade 38 so as to prevent the same from chattering or dropping into small recesses in the roadway in the grading operation.

In the scraping operation, the ram cylinders 19 are operated to press the beam 34 downward, which in turn, presses the blade 38 toward the road by hydraulic pressure, and the levelizers H being positioned near the ends of the blade, tend to raise the blade and to act against the pressure of the ram cylinders 19. The long shoes 47 on the levelizers H skid over the ground and hold the scraper blade 38 against chattering or digging into the road surface as has been done heretofore by old styles of scrapers or graders. My grader operates on the road as illustrated diagrammatically in Figure 10, which shows the correct cutting position of the blade 38 and shows the manner in which the blade is under constant control by the levelizers H.

The levelizers H are held braced in relation to the scraper blade by the adjustable brace arms I. The arms I are formed with end portions 50 and 51 which telescope and which are adapted to be held in the desired adjusted position by the set screws 52, more fully illustrated in Figure 3. My scraper device may be used without the arms I, if it is desirable, but it is preferred to use the same so as to adjust the levelizers H in the desired position in relation to the scraper blade 38. The levelizers H are pivotally supported at 54 to permit the levelizers to be adjusted horizontally, or to pivot at 54 in a horizontal direction in their operation when the brace arms I are not used. The spring mounting and the axles of the chassis are not illustrated in the drawings because they may be of any suitable construction or nature now in common use.

It is important in an under-body grader that the pull be from the front as I have disclosed in the drawbars 26 and 26', with the rear ends of the drawbars floating freely or controlled by the raising and lowering means to properly position the same in relation to the ground to bring the scraper mechanism into or out of operation with the ground.

It is equally important in an under-body grader where the same is connected to a truck or vehicle which has pneumatic tires and in which the chassis is mounted on springs, that the scraper blade be controlled against chattering or vibrating, and this I have accomplished with the combination of my levelizers and without which it is impossible, in my opinion, to plane the road surface smooth.

Further, it is equally important to the control the scraping blade so that it may be quickly raised out of engagement with road or that it may be lowered and forced toward the surface of the ground by cushioned pressure. This I have accomplished by utilizing the power of the motor vehicle and providing the pneumatic ram cylinders which cushionally control the scraper blade 38 and which permit with the levelizers, the smooth planing off of the high spots and the leveling off of the low spots in the road with a faster operation than has been accomplished heretofore and in a better manner than has been accomplished heretofore.

My method includes the hydraulic operation of the scraper mechanism controlled by the power from the motor vehicle carrying the scraper mechanism and the positioning of the scraper or grader mechanism under the body of the vehicle where it is ready for immediate use.

In accordance with the patent statutes I have described my under-body grader and the method of operating the same. The illustrations diagrammatically show the manner in which a form of the same may be used and the scope of this invention should be considered as extending to the fullest extent within the scope of the following claims.

I claim:

1. An under-body grader attached to the chassis of a motor driven vehicle, said under-body grader including a scraper blade, a pair of parallel spaced drawbars, said drawbars slidably supporting tubular beams, hydraulic ram means, said hydraulic ram means engaging said tubular beams to operate said scraper blade toward or away from the road surface, and resilient road engaging means tending to lift said blade away from the ground, whereby said blade is balanced between said hydraulic ram means and said resilient road engaging means to permit the same to be operated rapidly over the ground surface to level the same by cutting off the high spots and filling in the low spots without a chattering of said blade.

2. The combination of a motor vehicle and an under-body road scraping device, including a scraper blade and mold board, parallel spaced drawbars pivotally connected to the front end of said motor vehicle, tubular beams slidably mounted on said drawbars, cushion ground engaging means secured adjacent the ends of said scraper blade to overcome chattering of said blade, said blade pivotally secured to said tubular beams, a pair of hydraulically operated cylinders on either side of said motor vehicle adapted to control the raising and lowering of said tubular members and the free ends of said drawbars, and cushion means interposed between said hydraulic cylinders and said tubular members to absorb road shock between said tubular members and said operating cylinders.

3. A road grading device including a scraper blade, said road grading device pivotally secured beneath the chassis of a motor vehicle, a pair of cylinders having connecting rods, pivot means for pivoting said cylinders to said motor vehicle, triangular plates pivotally secured to said motor vehicle and connected to said cylinder by said connecting rods, a pair of drawbars mounted to the chassis of said motor vehicle, tubular members slidably mounted to said drawbars, said scraper blade pivotally secured to said tubular members, said tubular members being connected to said triangular plates by universal joint cushion links, said cushion links being adapted to absorb road shock which is transmitted from said scraper blade to said cushion link, levelizers pivotally connected to the ends of said scraper blade, said levelizers being adapted to hold said scraper blade against chattering, and hydraulic means for operating cylinders to lower and raise said scraper blade.

4. An under-body grader comprising a scraper blade and mold board, a pair of parallel spaced drawbars, a pair of tubular members slidably mounted on said drawbars, a pair of brackets on said tubular members, said scraper and mold board being pivotally mounted to said brackets, and cushion means connected to said tubular means for lowering and raising said drawbars.

5. A scraping device pivotally secured under the chassis of a motor vehicle, consisting of a scraper blade and mold board, a pair of drawbars pivoted to the front end of said motor vehicle, a tubular member slidably mounted on said drawbars, means of pivotally securing said scraper blade to said slidable tubular members, cushion links, said cushion links being pivoted to said tubular member, a pair of triangular plates pivoted to said motor vehicle, and means of pivoting said tringular plates to said cushion links, a pair of cylinders pivotally mounted to said motor vehicle, a pair of connecting rods, said connecting rods pivotally joining said cylinders and said triangular plates, and hydraulic means for operating said cylinders.

6. An under-body grader attached to the chassis of a motor driven vehicle, said under-body grader including a scraper blade, a pair of spaced parallel drawbars, said drawbars slidably supporting tubular beams, hydraulic ram means, said hydraulic ram means engaging said tubular beams to operate said scraper blade toward or away from the road surface.

LE GRAND H. LULL.